United States Patent Office 3,580,703
Patented May 25, 1971

3,580,703
PROCESS FOR THE PURIFICATION OF RESIDUAL GYPSUM FORMED IN THE MANUFACTURE OF PHOSPHORIC ACID BY THE ACTION OF SULPHURIC ACID ON NATURAL PHOSPHATES
Engelhard Pavonet, Chokier, Belgium, assignor to Fosindus Company, Willemstad, Curacao, Dutch Antilles
Continuation-in-part of abandoned application Ser. No. 434,834, Feb. 24, 1965. This application Feb. 27, 1969, Ser. No. 802,890
Claims priority, application France, Feb. 27, 1964, 965,314
Int. Cl. C01f 11/46
U.S. Cl. 23—122
14 Claims

ABSTRACT OF THE DISCLOSURE

A process is provided for the purification of residual gypsum formed in the manufacture of phosphoric acid by the sulphuric acid reaction on natural phosphates, the gypsum into coarse calcium sulfate hemihydrate crys- and phosphoric acids and continuously fed into an autoclave and treated therein at 105–150° C. to recrystallize the gypsum into coarse calcium sulfate herihydrate crystals in the presence of a large amount of hemihydrate crystals already present in the autoclave, and recover $P_2O_5$. The slurry is continuously withdrawn from the autoclave and the hemihydrate is separated from the liquid.

CROSS-RELATED APPLICATION

This is a continuation-in-part application of my earlier application, Ser. No. 434,834 filed Feb. 24, 1965 and now abandoned.

DETAILED DESCRIPTION

Figure 1:
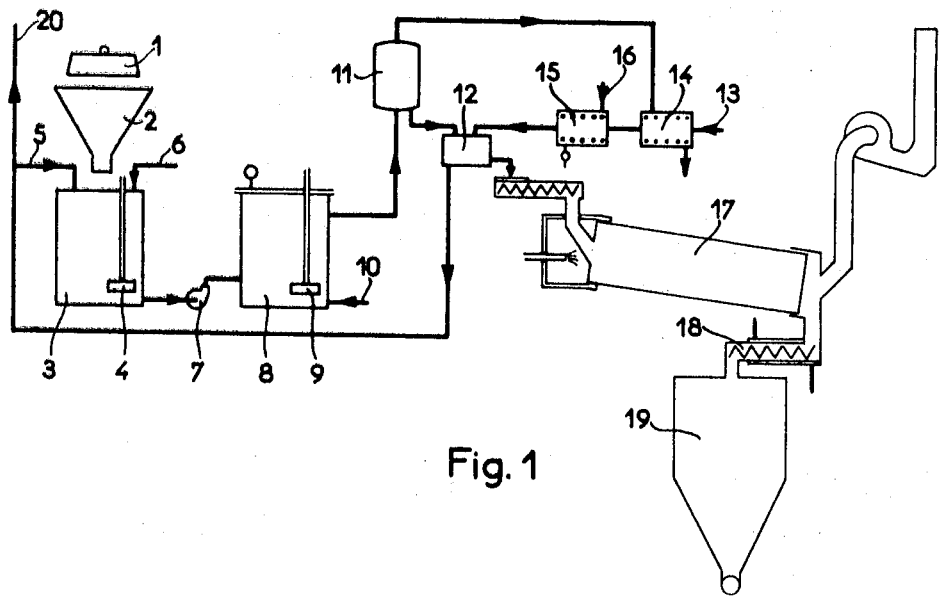
FIGS. 1 and 2 are diagrammatic illustrations of two embodiments of installations for carrying out the process of the invention.
Figure 2:
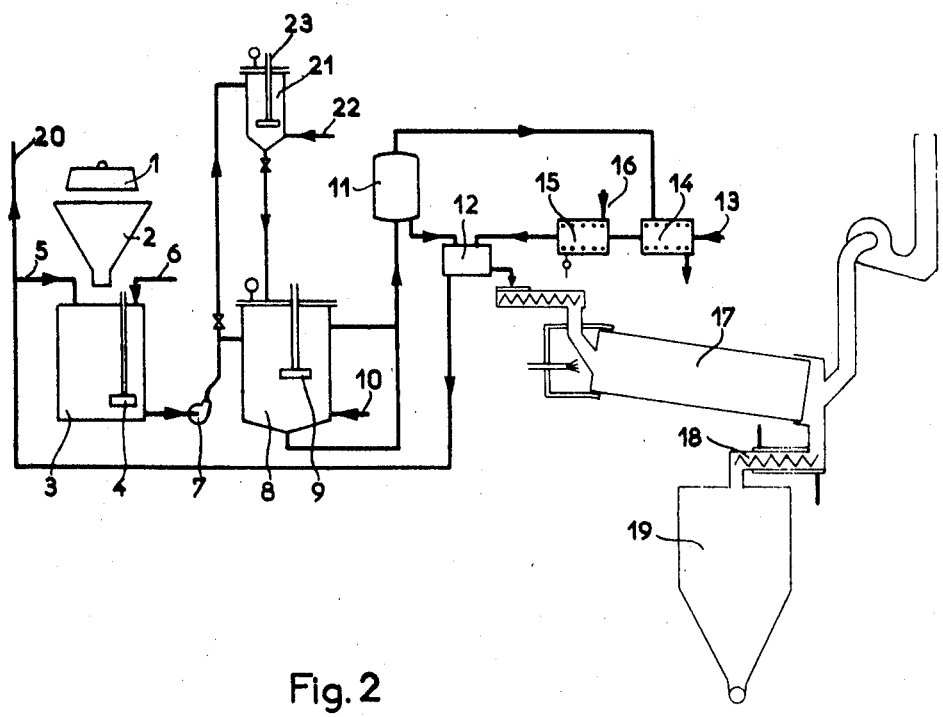

The invention relates to a process for the purification of residual gypsum, a by-product in the manufacture of phosphoric acid by the wet method, i.e., by the reaction of natural phosphates with sulphuric acid, said purification being obtained by recrystallization of this gypsum dihydrate into purified calcium sulphate containing a half-molecule of water of crystallization, i.e., the hemihydrate.

It is known that, in the manufacture of phosphoric acid by the wet method, the calcium sulphate finally assumes the form of gypsum dihydrate which is separated by filtering, decanting or centrifuging from the phosphoric acid produced. The extraction yield of $B_2O_3$ contained in the phosphates varies according to the phosphates and is generally of the order of 96%. It is known that the major part of the $P_2O_5$ ordinarily characterized as non-reacted is actually contained in the crystalline network of the residual gypsum. So the network consists in fact of $P_2O_5$ solubilized by acid attack and then reprecipitated by co-crystallization. The residual gypsum contains still further impurities, such as organic matter, compounds of fluorine, silica, alkalis, magnesia, iron and alumina.

An object of the invention is to effect purification of the said residual gypsum, and to insure production of purified calcium sulphate in the hemihydrate form, capable of use as a hydraulic binder, notably in the form of the coarse crystals having a size greater than twenty microns in all three dimensions, these dimensions reaching in general very much greater values, for example, from 50 to 1500 microns.

A further object of the invention is to carry out the said purification in such a manner as to permit an effective recovery of the impurities freed from the gypsum in the course of the said recrystallization and in particular of $P_2O_5$, notably in the form of an acid solution capable of being reused in the process for the production of phosphoric acid by the wet method, thus substantially increasing the extraction yield of $P_2O_5$ in the said production.

It is known that the residual gypsum in suspension in the dilute aqueous solution can be converted into hemihydrate in an autoclave at temperatures in excess of 100° C. and that this recrystallization can be orientated, by the addition of a small amount of special materials for the production of hemihydrate as compact large grains. These substances are, for example, organic acids of single or double acid function, proteins, keratin, glue, etc.

The hemihydrates thus obtained are distinguished by their excellent properties which make them a first-class material for the production of plaster. This so-called autoclave plaster is characterized, for example, by its high strength in tension as well as in compression and in flexure. It has a high apparent density and requires only little water for its mixing.

It is known that conversion to the hemihydrate can also be obtained at ordinary pressures in a concentrated saline solution of KCl, $CaCl_2$, NaCl, $MgSO_4$, or mixtures of these salts. The same crystalline forms are obtained as in autoclave treatment when using auxiliary materials such as residual sulphitic solutions from the cellulose industry, alkylarylsulphonates, organic acids, etc.

The conversion is obtained at temperatures above or at about 100° C. with agitation of the gypsum when in suspension in saline solution, or simply introduced without agitation.

It is also known that the sulphuric acid and other acids lower the vapor tension of the water and thus make possible the dehydration of the gypsum suspended in an acid-water medium at temperatures lower than in a purely aqueous medium. However, the literature on this subject does not contemplate a practical process for the conversion of gypsum into hemihydrate having suitable characteristics to enable it to be used as construction materials.

All these known processes operate discontinuously in the sense that the gypsum and the treatment solution are mixed together in a reactor, then brought progressively to the temperature necessary for the conversion of the gypsum into the hemihydrate, and then extracted from the reactor.

In contrast to these known processes, the process according to the present invention effects the dehydration in a continuous manner, by putting the residual gypsum in suspension in a liquid, introducing the thus formed pulp, i.e., slurry of gypsum continuously into the autoclave (pressure vessel) provided with agitating means, heating the slurry in the autoclave at substantially constant temperature, while maintaining in the slurry a substantially constant concentration of sulphuric acid and withdrawing continuously a corresponding amount of reacted pulp.

The autoclave operates under steady state conditions of temperature, acidity and pressure, the necessary heat being provided by injection of live steam or by indirect heating devices. In the autoclave, there is thus a mixture of liquid, non-reacted dihydrate and hemihydrate. The speed of transformation of the dihydrate into hemihydrate is very rapid under the chosen conditions, and the freshly injected dihydrate is completely converted into hemihydrate in a very short time, generally of the order of less than 30 seconds. The mean retention time of the slurry in the autoclave being normally between 0.5 and 2 hours, the mixture in the autoclave mainly contains hemihydrate (more than 95% and even more than 99% of the solids) and only a very small amount of dihydrate crystals.

The recrystallization of gypsum into hemihydrate thus takes place in the presence of a very large amount of freshly formed hemihydrate crystals, permanently present in the autoclave so as to accelerate the reaction and to direct it towards the formation of very coarse hemihydrate crystals of a size of at least 20μ in all three directions, these coarse crystals constituting the major portion of the solids present in the autoclave. The concentration of solid dihydrate in the pulp before treatment is at about 20 to 60% by weight, preferably 30 to 40%. The temperature of treatment in the autoclave is at 105 to 150° C., preferably at 120 to 130° C. The sulphuric acid concentration in the liquid phase of the autoclave is about 0.25 to 10% by weight, preferably 1.0 to 5%, and the phosphoric acid concentration is about 0.25–5% (preferably 0.5–3%) by weight, the ratio $P_2O_5/H_2SO_4$ being adjusted to 0.5 to 1.5. The higher acid concentrations correspond to the lower temperatures and vice versa. The amount of hemihydrate solid in the autoclave is at about 17 to 50%, preferably about 25 to 33% by weight of the pulp, taking into account that the ratio of the molecular weights of the hemihydrate and the dihydrate is 145/172. In the autoclave, the pressure corresponding to the temperature is between 1.2 and 4.5 kg. per square cm., preferably between 2 and 3 kg. per square cm., above atmospheric, the higher pressures corresponding to the higher temperatures.

The use of auxiliary materials to promote the formation of large crystals is not absolutely necessary, the very principle of continuous crystallization favoring the formation of large crystals while minimizing the formation of small seed crystals (nuclei).

It is possible, by acting, whether on the temperature of the medium or on the mean duration of retention in the autoclave (viz, the quotient of the volume of the reactor by the hourly through-put volume), to influence, within certain limits, the formation of seeds and thus the mean size of the crystals obtained. Indeed, if the speed of recrystallization is very rapid, the addition of the gypsum creates, however, a certain supersaturation non-absorbed by the growth of the crystals present, which supersaturation is a function of the mean time of retention and tends to form new seeds (nuclei). When the retention time is long, the addition of materials to be crystallized is small per unit of time and the supersaturation of $CaSO_4$ is low. In this case, the growth of the crystals is more regular and uniform, with less twinning and there is less formation of seed; there is, in the whole range of crystal sizes present in the autoclave, less of the small crystals than when the mean retention time is lower.

It may be noted that in practice the mean retention time is normally held between 0.5 and 2 hours.

In order that the recrystallization operation can be carried out in the presence of already formed hemihydrate crystals, it is necessary in practice that the construction of the autoclave should be such as to permit a rapid back-mixing of the finished product with the new feed. The continuous recrystallization of the $CaSO_4$ in the presence of already formed hemihydrate crystals develops, in working conditions, quite a wide range of different sizes varying from very small crystals to very large crystals. It is thus useful for the autoclave while being suitably agitated to bring about the instantaneous dispersion of the fresh dihydrate slurry, to be of adequate form to permit some classification, so that the slurry withdrawn from the autoclave shall contain a larger proportion of coarse crystals than the mean proportion in the autoclave.

This effect can be obtained by proper design of the autoclave and the agitator. Thus the diameter/height ratio of the cylindrical portion of the autoclave has to be close to one and the agitator of proper size, type and power as to develop large circulating flows combined with heavy turbulence in the zones crossed by the flow. Normally, in agitated vessels with substantially central agitators, the rotating motion of the slurry around the axis of the vessel is avoided by baffling. In the case of the present invention, by avoiding all baffles, a rapid rotation of the slurry is developed. This rotation will permit a classification of the crystals by centrifugal action, the larger crystals being accumulated near the cylindrical wall on the under side of the autoclave where they may be withdrawn. In another arrangement, the autoclave is baffled and an unbaffled conical bottom portion is provided. At this bottom portion, the agitating force decreases and the larger crystals accumulate and may be selectively withdrawn.

The continuous withdrawal from the autoclave of slurry comprising hemihydrate crystals forming almost all of the solids present and the aqueous mixture of sulphuric and phosphoric acids containing $P_2O_5$ recovered from the residual gypsum, is effected continuously in an amount corresponding to that of the feed materials.

It is likewise possible to influence the shape of the crystals obtained, particularly to obtain crystals of more uniform form, by adding to the autoclave, either continuously or at regular intervals, very small hemihydrate crystals (seed crystals) of uniform shape obtained in one or more small auxiliary autoclaves operating discontinuously. The volume of a seed crystal is generally at least one hundred times smaller than a mean volume of the finally withdrawn coarse hemihydrate crystal.

The necessary quantity of the small seed crystals will represent a weight of material of the order of 0.5% to 5% by weight of the total material transformed, that is, of the gypsum fed during the same time. This manner of working enables the formation of seeds by spontaneous nucleation to be avoided in the main autoclave, and likewise the twinning of crystals (irregular growth in several directions) during their growth, and thus enables obtaining crystals which are very uniform as regards dimensions and shape.

The one or more said auxiliary autoclaves can be operated in any convenient manner to produce hemihydrate seed crystals, but in practice the operation can be simplified by periodically feeding the autoclave with the gypsum slurry which is also used for feeding the main autoclave, the slurry being heated to the reaction temperature thereby to recrystallize the gypsum into hemihydrate and the obtained hemihydrate slurry is then fed into the main autoclave. When the latter is to be fed continuously with hemihydrate seed crystals, two auxiliary autoclaves will be used, so that, while seed crystals are being prepared in one auxiliary autoclave, the seeds already formed in the other auxiliary autoclave are continuously fed into the main autoclave.

The sulphuric acid present during the recrystallization permits the solubilization of syncrystallized $P_2O_5$ and of a part of other impurities (principally alkalis and MgO). It operates similarly on any fluorine content, an important part of which is volatilized in the form of HF or $SiF_4$.

If operating in an autoclave at a temperature of 120° C. and in the presence of 2% to 3% sulphuric acid in the liquid of the suspension, the content of $P_2O_5$ of the washed coarse grain hemihydrate that results from the reaction is of the order of less than 0.10% by weight of the material dried at 150° C. It should be noted that in the initial residual gypsum, the corresponding content of $P_2O_5$ is of the order of 0.5% to 1.5% by weight of the material dried at 150° C.

The acidic treatment in the autoclave thus solubilizes a large amount of valuable $P_2O_5$ in a solution also containing some $H_2SO_4$.

It is possible to use such a solution without difficulty in wet phosphoric acid processes or other processes where the introduction of dilute acid solution is possible, thus increasing the overall $P_2O_5$ recovery of the combined processes. The possibility of recovery of $P_2O_5$ is one of the important characteristics of the process of this invention.

The products in the form of coarse grain hemihydrate obtained according to the invention is separated from the accompanying liquid by filtration, decanting or centrifuging, all while the temperature is maintained above 80° C. so as to avoid any rehydration. The hemihydrate is finally dried rapidly and at a temperature held between 80° C. and 120° C., which is high enough to avoid rehydration, but low enough to avoid the formation of anhydrite ($CaSO4$).

The dehydrated product (hemihydrate) obtained according to the invention is very coarse (with dimensions generally between 50 to 1500 microns), and the filtering speeds obtainable are very substantial while the residual moisture contents after filtration and centrifuging are very low. The use of continuous centrifuges and centrifugal decanters is thus particularly applicable for the treatment of the slurries leaving the reactor.

The treatment in the autoclave is preferably of a dihydrate slurry of very high content of solids (20% to 60% by weight). This manner of working has the advantage that the heat requirement per unit by weight of the gypsum treated can be reduced. A part of the heat requirement for the reaction may be provided from the dilution of the sulphuric acid added in concentrated form (for example, sulfuric acid with 98% $H_2SO_4$).

The process requires that the initial gypsum be introduced in the form of a pulp (slurry) by the addition of a liquid. According to the invention, this liquid is preferably constituted by a part of the separated solution after the autoclave treatment and filtration, centrifuging or decanting of the resultant slurry. This solution diluted by the wash-water will partially serve for the production of the initial slurry. Since it is very hot (about 60° C. to 90° C.), the sensible heat carried with it reduces the heat consumption of the process. The treatment solution thus partially follows a closed circuit and in this way finds itself enriched with certain elements such as $P_2O_5$ and the like.

It is possible by this method to obtain rather concentrated solutions of $P_2O_5$ containing up to 3–5% by weight of $P_2O_5$ besides the sulphuric acid content. As explained before, the recoverability of valuable $P_2O_5$ is one of the important features of the process. Now the greater the concentration of the recovered acid solution, the easier its use will be in industrial processes, all depending on more or less stringent water balances.

The sulphuric and phosphoric acid concentrations in the slurry have an influence on the gypsum recrystallization speed and the stability and crystal form of the resultant hemihydrate. While the sulphuric acid speeds up the recrystallization into hemihydrate at a given temperature, it also speeds up the formation of insoluble anhydrite ($CaSO4$). The phosphoric acid on the contrary, restrains the recrystallization speed and stabilizes the resultant hemihydrate, avoiding the formation of anhydrite. It also blocks some of the most reactive recrystallization centers of the hemihydrate, producing less elongated and more compact crystals.

Thus, it is desirable to recycle some of the treatment liquid to adjust the resulting $H_2SO_4$ rates in the slurry to be introduced into the autoclave. In order to obtain rapid recrystallization speeds and stable and compact crystals, the liquor in the autoclave should have from 0.25 to 5% by weight $P_2O_5$ (preferably 0.5 to 3%) and from 0.25 to 10% (preferably 1 to 5% by weight) of $H_2SO_4$, the ratio $P_2O_5/H_2SO_4$ being adjusted to 0.5 to 1.5.

It is convenient to note here that the crystalline form of hemihydrate obtained by the invention is the $CaSO_4 \cdot \frac{1}{2}H_2O$ alpha-hemihydrate, crystallized in the form of simple or twinned hexagonal prisms. The form of the hemihydrate crystals is influenced, as described before, by the acids of the medium and also by the impurities present. It can, in addition, be influenced by the intentional addition of certain active materials previously discussed.

It is finally to be noted that the hemihydrate crystals obtained according to the process of the invention can be easily rehydrated to the gypsum dihydrate state. In order to effect this, it suffices to add to the centrifuged or filtered material, the quantity of water necessary for the rehydration or an excess thereof and to allow the product to cool. The presence of lime, gypsum and salts such as $K_2SO_4$ and $Al_2(SO4)_3$ catalyzes the reaction. The gypsum dihydrate obtained is of very great purity and is entirely suited for use as a retarder in the cement industry or as a raw material for commercial betaplaster. Its content of $P_2O_5$ lies between 0.01% and 0.20% by weight.

By way of illustration, two examples of the process of the invention will be described below with reference to the accompanying drawing which shows diagrammatically two installations.

EXAMPLE 1 (FIG. 1)

The gypsum arriving from the final washing filter 1 of an installation for the manufacture of phosphoric acid by the wet method and containing, for example, about 25% of water by weight, is led by a chute 2 into the vessel 3, where it is repulped by the agitator 4 with hot acid solution fed continuously by the pipe 5 from the final separation device 12 for the crystals produced according to the invention. The sulphuric acidity of the pulp is regulated by the addition of fresh sulphuric acid at 6. The pulp, adjusted to about 40% by weight of solid dihydrate, is transferred by the pump 7 into the autoclave 8, provided with an agitator 9, where the pulp is brought to 125° C. by the injection of steam at 10. The pressure in the autoclave is about 2 to 2.5 kg./cm.$^2$ above atmospheric. The liquid in the autoclave contains about 2% of $P_2O_5$ and about 2% sulphuric acid (on a weight basis). The pulp in the autoclave contains about 32–33% of solid crystals (mainly hemihydrate). The pulp leaving the autoclave continuously is depressurized at 11 and transferred to the separating device 12, for example, a horizontal filter, where the alpha-hemihydrate crystals obtained are separated from the mother liquors and finally washed with hot water. The steam released from the depressurizer 11 serves for the preheating of the wash water fed at 13 into the preheater 14, this water then being brought to the desired temperature in 15, by heating with the aid of steam fed at 16. The product now with about 5–15% by weight of impregnating moisture, is dried in the dryer 17, then cooled in a feed screw 18 cooled by water, and finally deposited into a hopper 19. The product is then ready for grinding and bagging. The hot acid liquid leaving the filter 12 returns by line 5 to the repulping in the vessel 3, and a part, constituting the bleed, returns by line 20 into a circuit for the manufacture of phosphoric acid. At the outlet of the separating device 12, the moist crystals may, as an alternative, be received in a continuous paddle mixer in which their water content is adjusted to 22% (at 150° C.) and lime is added and, if necessary other rehydration catalysts. The product is granulated and then deposited in a heap where it rehydrates progressively.

EXAMPLE 2 (FIG. 2)

The gypsum arriving from the final washing filter 1 of an installation for the manufacture of phosphoric acid by the wet method and containing about 25% water by weight is led, as in the preceding example, into the vessel 3 where it is repulped with the acid solution fed at 5. The acidity of the pulp is maintained by adding fresh sulphuric acid at 6. The pulp adjusted to about 50% by weight of solids (dihydrate) is pumped towards the autoclave 8. At regular intervals (for example, once every 8 hours) the auxiliary autoclave 21 is fed with the same pulp, this being heated to a temperature of 120–130° C. by steam injected at 22 and agitated by agitator 23. When the seeds have been formed, they are introduced in regular manner into the autoclave 8 which operates continuously at, for example, 120° C. The auxiliary autoclave is thus working batchwise and not continuously, in order to supply very fine seed crystals having a volume at least 100 times smaller than the mean volume of the hemihydrate crystals finally produced.

The pulp leaving the autoclave 8 continuously is brought to normal pressure in 11 and transported to the separating device 12. The pulp enters the separating device 12 (for example, a continuous decanter) where the alpha-hemihydrate crystals obtained are separated from the mother liquors and then washed with hot water. The separated liquid and the solid are subjected to the same treatments as in Example 1.

What is claimed is:

1. A process for the purification of residual gypsum formed in the manufacture of phosphoric acid by the sulphuric acid reaction on natural phosphates, said process comprising forming a slurry of residual gypsum by suspending same in a concentration of 20–60% solids in an aqueous mixture of sulphuric and phosphoric acids, continuously introducing said slurry into an autoclave with agitation, heating said slurry in the autoclave at a temperature of 105–150° C., while maintaining therein a concentration of sulphuric acid of 0.25–10% by weight and a concentration of phosphoric acid of 0.25–5% by weight to recrystallize the residual gypsum as calcium sulfate hemihydrate crystals in the presence of a large amount of hemihydrate crystals previously formed in said autoclave and constituting at least about 95% by weight of the solids present in the autoclave and containing a major proportion of coarse hemihydrate crystals having a size of at least 20μ in all three directions, and continuously withdrawing from the autoclave an amount of the slurry containing hemihydrate crystals being for the major part of coarse size and the aqueous mixture of sulphuric and phosphoric acids containing $P_2O_5$ recovered from the residual gypsum, which amount corresponds to that of the feed materials introduced into the autoclave, the acid concentrations and temperatures being correlated so that the higher temperatures correspond to the lower acid concentrations and the lower temperatures to the higher acid concentrations.

2. A process as claimed in claim 1, wherein the said concentration of sulhpuric acid is 1–5% and the concentration of phosphoric acid 0.5–3% by weight.

3. A process as claimed in claim 1, wherein the temperature in the autoclave is 120–130° C.

4. A process as claimed in claim 1, wherein the concentration of gypsum is 30–40% by weight in the mixture of sulphuric and phosphoric acids.

5. A process as claimed in claim 1, wherein the said large amount of hemihydrate crystals attains at least 99% by weight of the solids present in the autoclave.

6. A process as claimed in claim 1 comprising producing hemihydrate seed crystals in a second, separate autoclave and continuously introducing these seed crystals into the first said autoclave in an amount of 0.5 to 5% by weight of the gypsum introduced therein.

7. A process as claimed in claim 1 comprising producing hemihydrate seed crystals in a second, separate autoclave and periodically introducing these seed crystals into the main autoclave in an amount of 0.5 to 5% by weight of the gypsum introduced therein during the same period of time.

8. A process as claimed in claim 1, wherein the retention time of the slurry in the autoclave is between 0.5 to 2 hours.

9. A process as claimed in claim 1, wherein the autoclave is shaped and the slurry agitated to produce rapid dispersion of the fresh feed and provide classification of the hemihydrate crystals to insure the withdrawal of the more coarse and uniform crystals.

10. A process as claimed in claim 9, wherein classification of the crystals is obtained by rotating the slurry.

11. A process as claimed in claim 9, wherein classification of the crystals is obtained by sedimentation of the crystals in a conical bottom of the autoclave which narrows downwardly.

12. A process as claimed in claim 1 comprising separating the crystals formed from the withdrawn slurry and reintroducing at least part of the remaining liquid into the cycle for the preparation of the slurry from the gypsum, thereby to adjust the $P_2O_5$ content of the autoclave liquid to a level of about 3–5% by weight.

13. A process as claimed in claim 1 comprising separating the hemihydrate product from the withdrawn slurry and then rehydrating it into gypsum dihydrate by the addition of water.

14. A process as claimed in claim 1 wherein the ratio $P_2O_5/H_2SO_4$ is between 0.5 and 1.5.

References Cited

UNITED STATES PATENTS

| | | | |
|---|---|---|---|
| 2,002,547 | 5/1935 | Nordengren | 23—165 |
| 3,306,710 | 2/1967 | Messing | 23—273 |
| 3,337,298 | 8/1967 | Ruter et al. | 23—122 |
| 3,416,887 | 12/1968 | Matsubara et al. | 23—122 |

OSCAR R. VERTIZ, Primary Examiner

G. A. HELLER, Assistant Examiner

U.S. Cl. X.R.

23—165